Patented Aug. 30, 1932

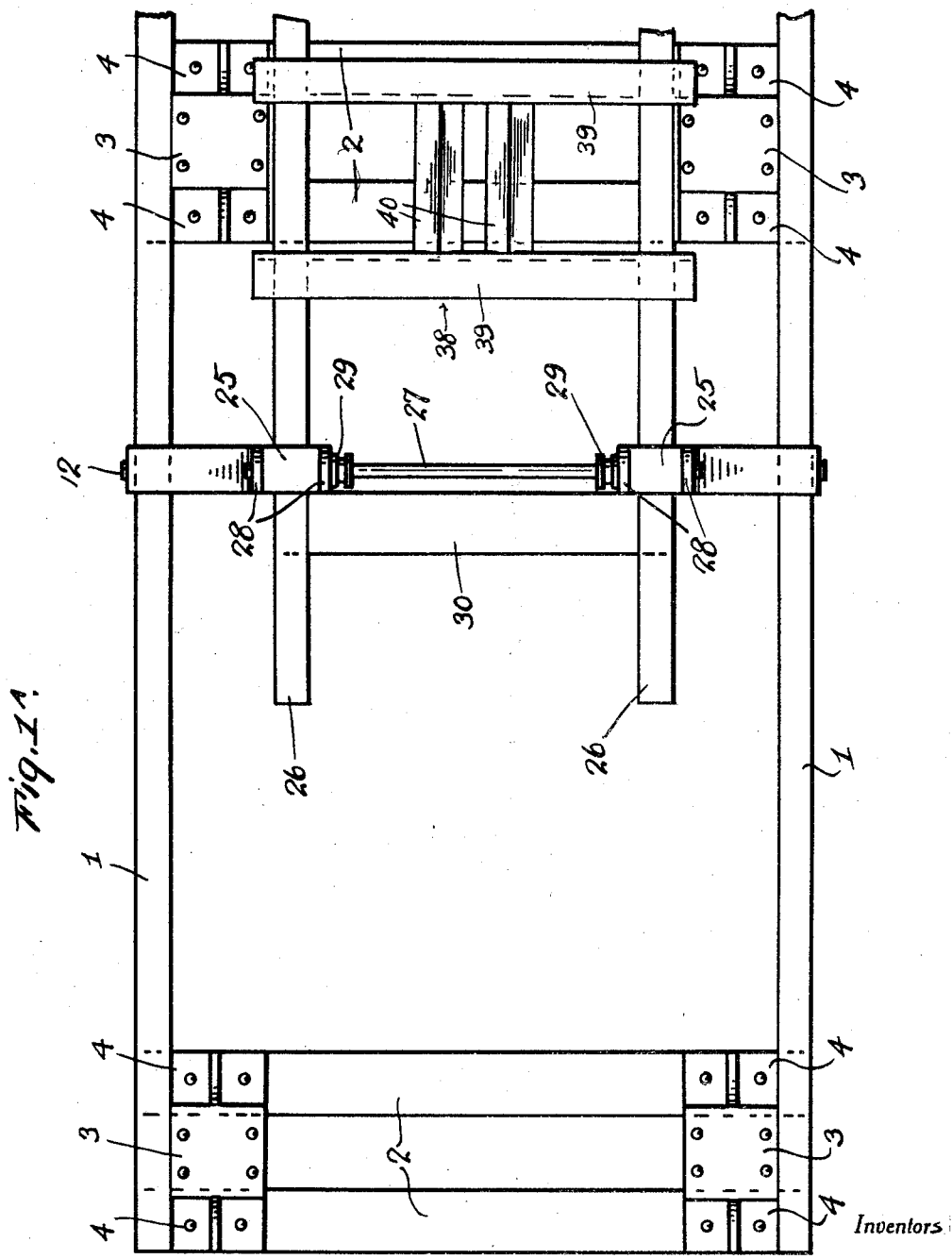

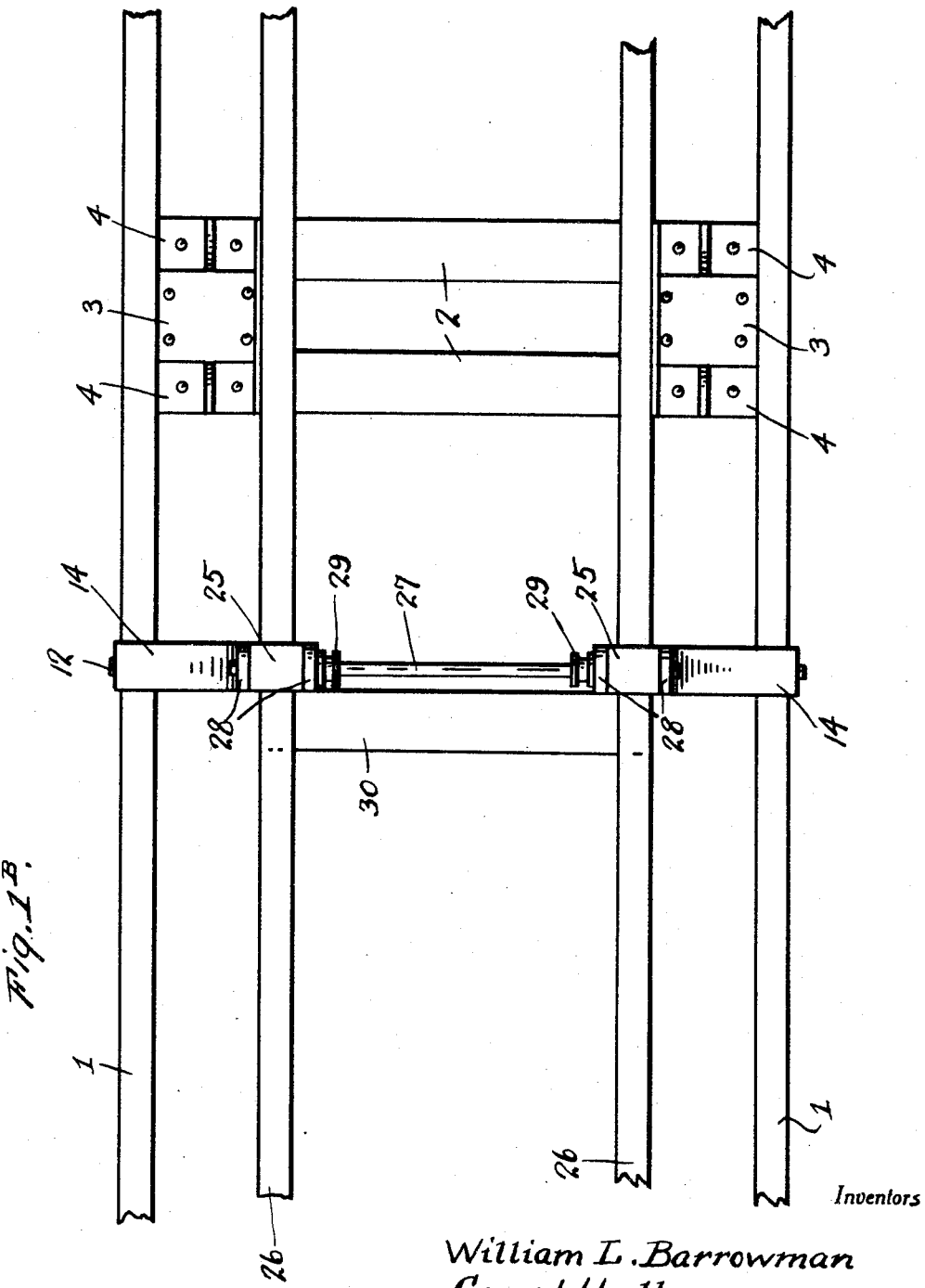

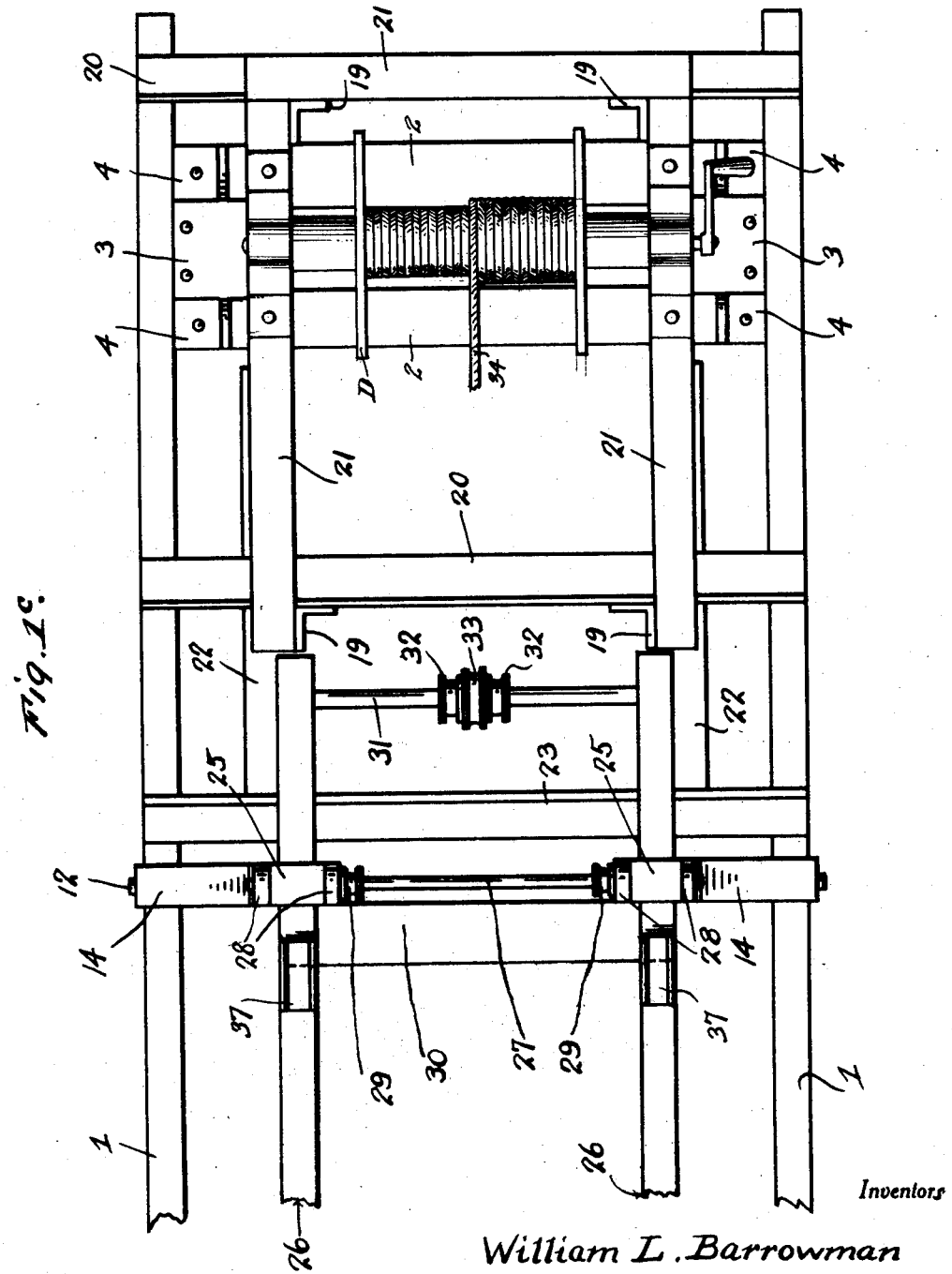

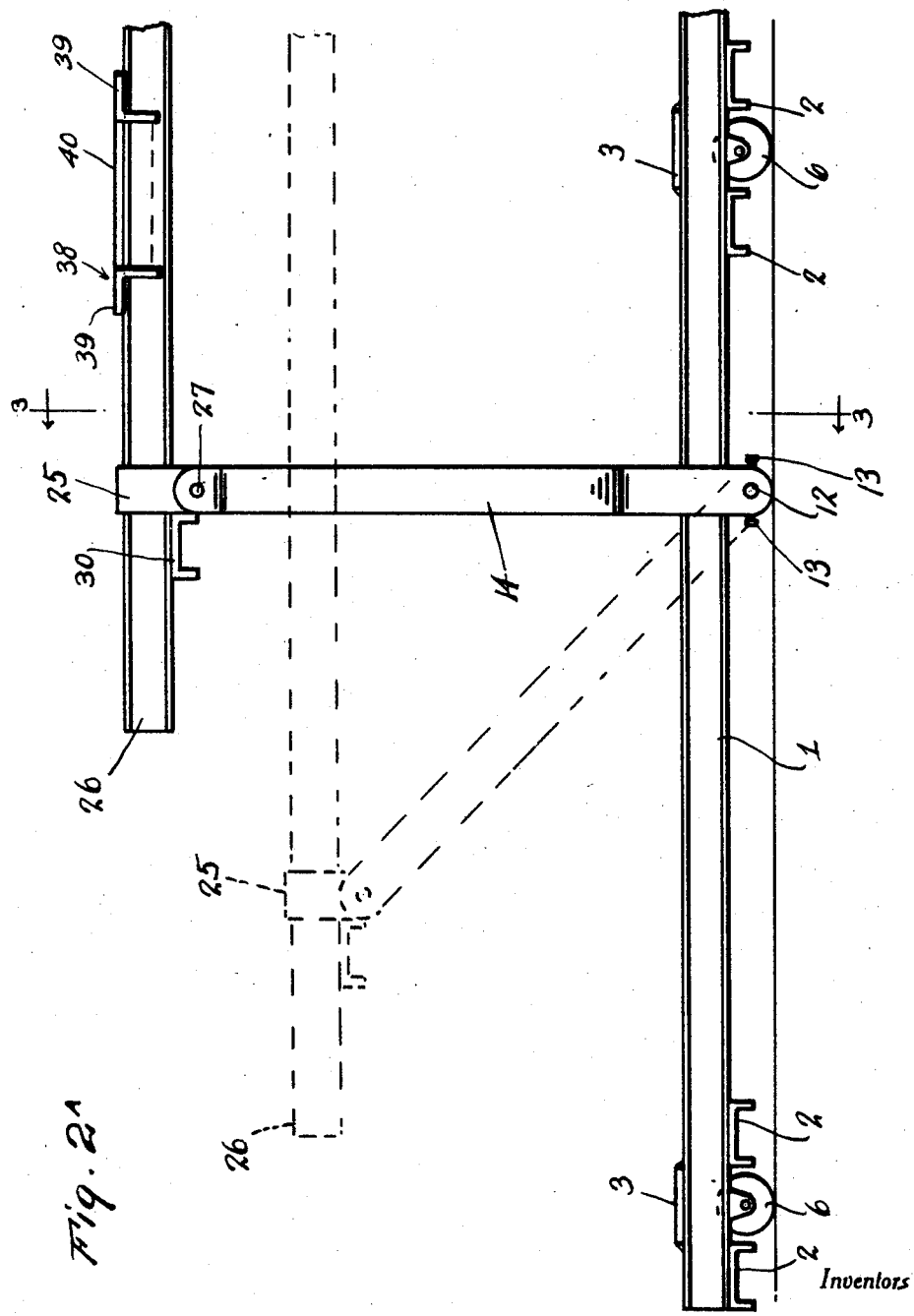

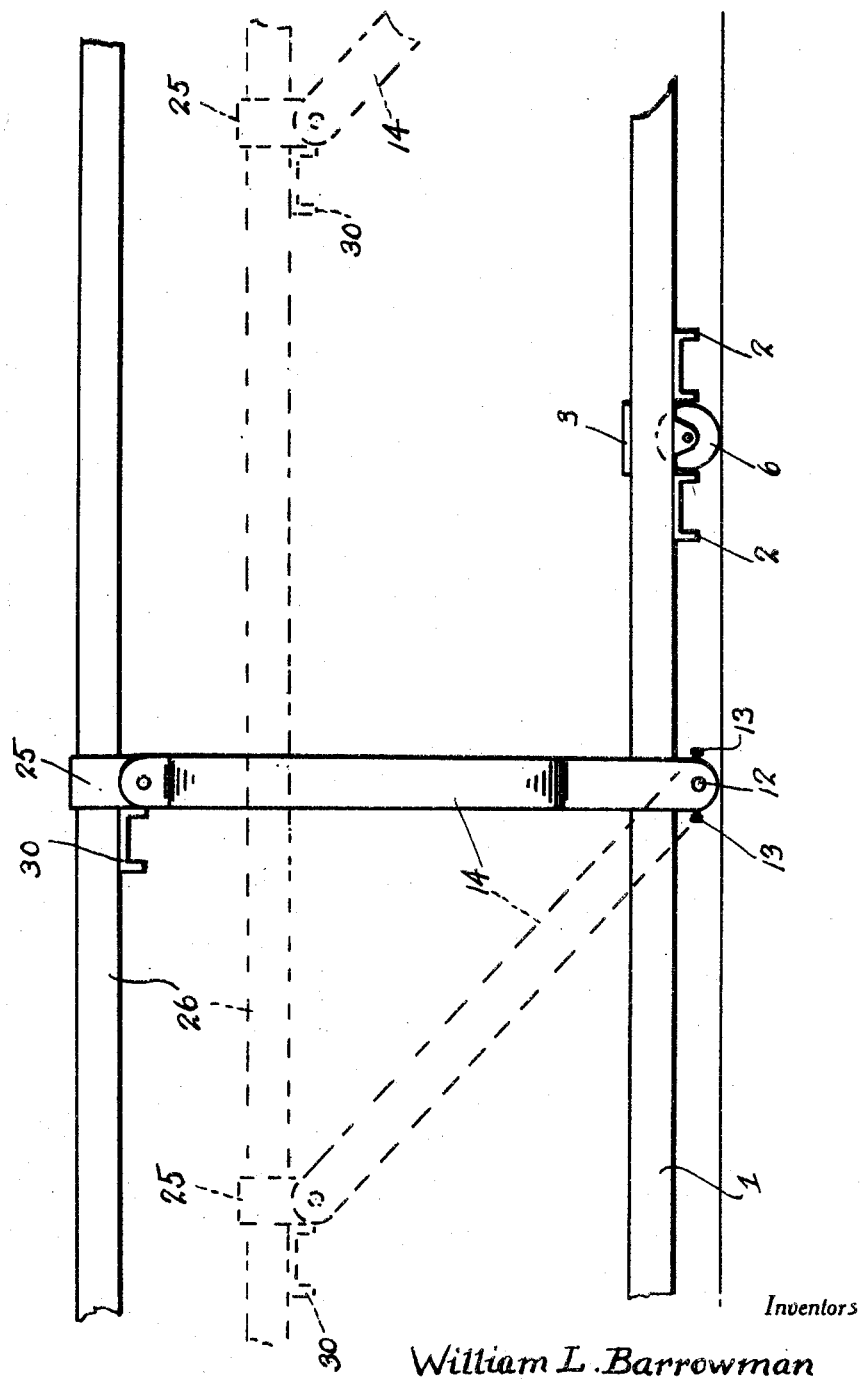

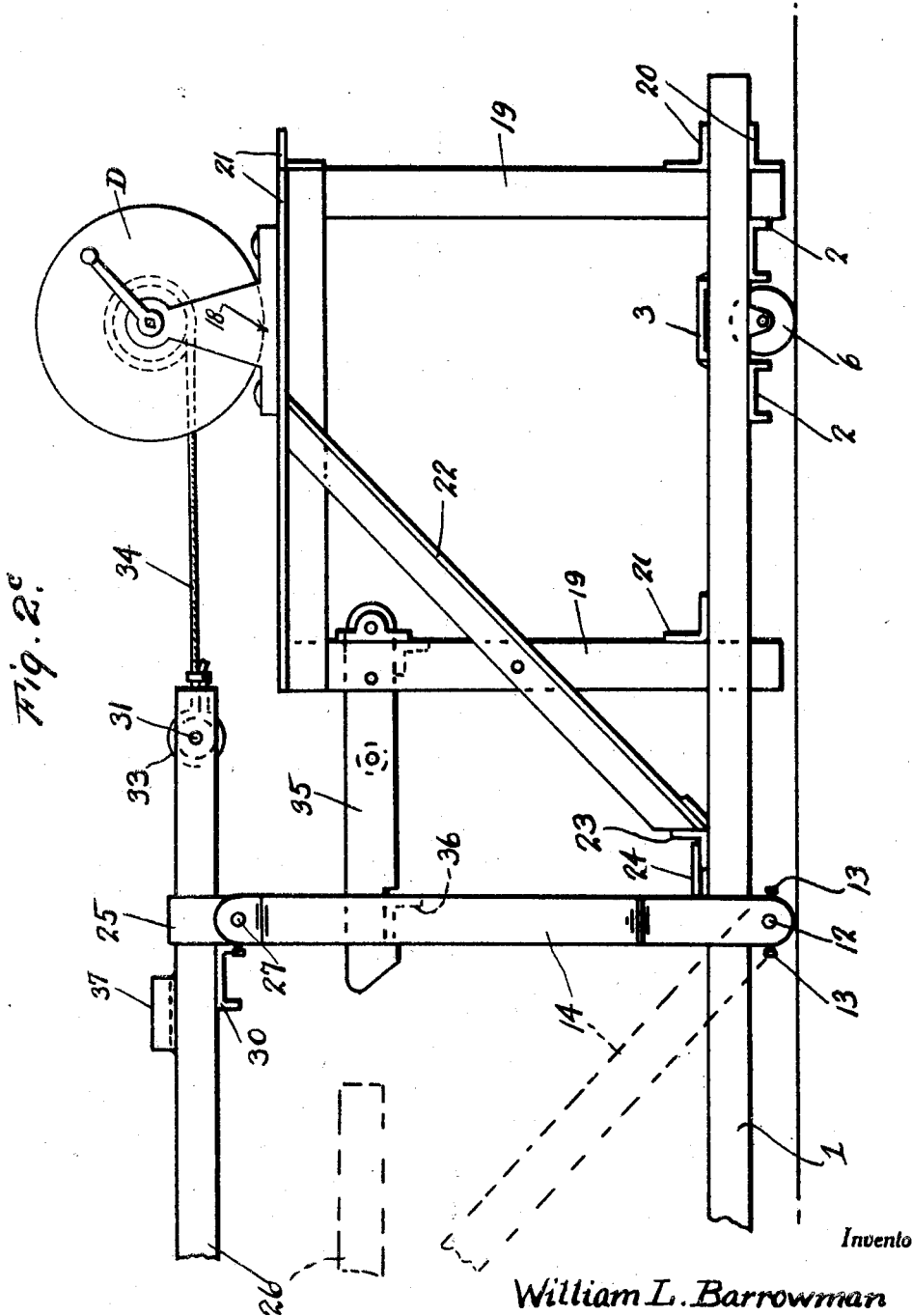

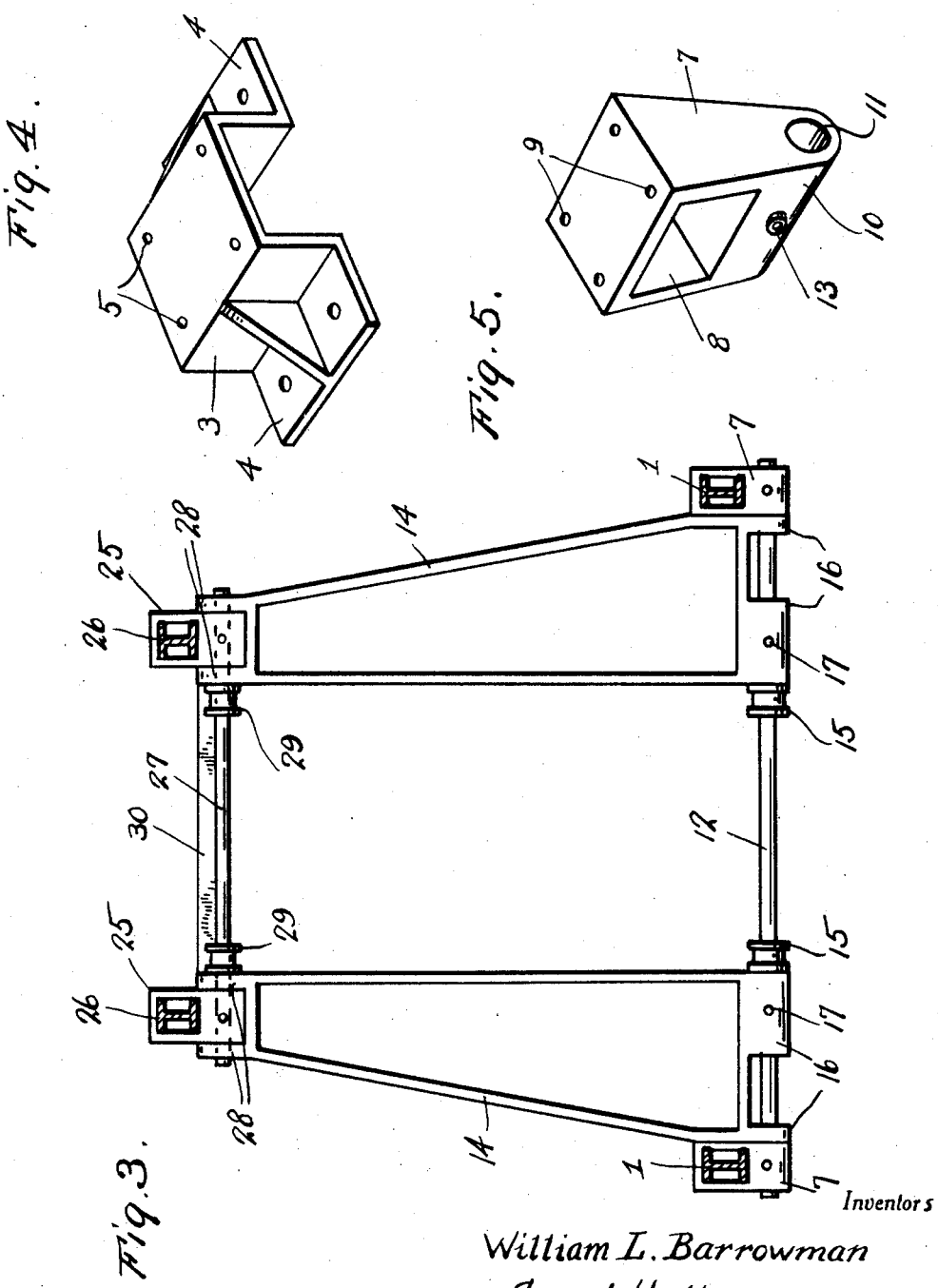

1,874,420

UNITED STATES PATENT OFFICE

WILLIAM L. BARROWMAN AND GUYE L. HULL, OF ALBUQUERQUE, NEW MEXICO

VEHICLE JACK

Application filed November 15, 1930. Serial No. 495,999.

This invention relates to new and useful improvements in vehicle jacks and has for its primary object to provide, in a maner as hereinafter set forth, a vehicle jack embodying a novel construction and arrangement of parts whereby all four wheels of the vehicle may be simultaneously raised from the ground to facilitate washing, greasing or repair operations being performed on the vehicle.

Another important object of the invention is to provide a vehicle jack of the aforementioned character including means for receiving a power device for actuating the jack in a manner to raise or lower the vehicle.

Another object of the invention is to provide a vehicle jack of the character described which includes means for positively securing the jack in raised or operative position for preventing accidental lowering of the vehicle.

Other objects of the invention are to provide a vehicle jack which is simple in construction, strong, durable, efficient in operation and which may be manufactured at a low cost.

All of the foregoing and still further objects of the invention will become apparent from a study of the following specification, taken in connection with the accompanying drawings wherein like characters of reference designate corresponding parts throughout the several views, and wherein:

Figure 1A is a fragmentary view in top plan showing the forward end portion of a jack constructed in accordance with this invention.

Figure 1B is a fragmentary view in top plan of an intermediate portion of the jack.

Figure 1C is a fragmentary view in top plan of the rear end portion of the jack upon which the power device is mounted.

Figure 2A is a fragmentary view in side elevation of the forward end portion of the invention.

Figure 2B is a fragmentary view in side elevation of the intermediate portion of the jack.

Figure 2C is a fragmentary view in side elevation of the rear end portions of the jack which supports the power device.

Figure 3 is a vertical cross sectional view taken substantially on the lines 3—3 of Figure 2A looking in the direction indicated by the arrows.

Figure 4 is a detail view in perspective of one of the caster supporting plates or housings.

Figure 5 is a detail view in perspective of one of the hangers which constitutes an important element of the invention.

Referring to the drawings in detail, it will be seen that the reference numeral 1 designates a pair of spaced, parallel, co-extensive base bars which are formed of I-beams and which are connected together at longitudinally spaced points by the spaced parallel pairs of struts 2 which are channel shaped in cross section and have their open sides turned downwardly, the cross struts 2 being secured to the lower sides of the base bars 2. Any desired number of pairs of the struts 2 may be provided and a pair of struts is preferably provided at each end of the base bars 1. Caster housings 3 of substantially inverted U-shaped configuration extend between the end portions of each pair of the struts 2, said housings being provided on their ends with the apertured, braced flanges 4 for the passage of securing elements such as rivets or bolts for rigidly securing the housing in position. One of these housings is illustrated in detail in Figure 4 of the drawings. Each of the housings 3 has its intermediate or horizontal portions provided with openings 5 to facilitate securing the caster in position thereunderneath. The casters are designated by the reference numeral 6 and may be of conventional construction. It will thus be seen that the casters 6 are disposed for operation between the end portions of each pair of struts 2 for supporting the base bars 1 in slightly elevated position.

Fixed at longitudinally spaced points on the base bars 1 are the pairs of hangers 7 of the construction and configuration thus illustrated in Figure 5 of the drawings. The upper portion of each hanger 7 is provided with an enlarged opening 8 for the reception of the base bars 1 and the upper side of said hangers are further provided with the openings 9 for the passage of securing elements for anchoring the hangers in position on the base bars 1 for preventing longitudinal movement on said base bars. Each of the hangers 7 further includes a reduced, rounded lower end portion 10 through which extends a transverse bore 11 for the reception of the end portions of the transverse shafts 12 one of which is provided for each pair of the hangers 7. A suitable fitting 13 is provided on each of the hangers 7 for lubricating the bore 11.

Mounted on the shafts 12 adjacent the inner side of each of the hangers 7 for swinging movement in a vertical plane are the standards 14 which are retained in position on the shafts 12 by the collars 15 which are fixed on the shafts. Each of the standards 14 has formed on its lower end the aligned bearings 16 for the passage of the shafts 12. A suitable lubricant fitting 17 may be provided on the larger of the bearings 16 for lubricating said bearings. The outermost pairs of the standards 14 are fixed on the opposite ends of the base bars 1, as best seen in Figures 1a and 1b and in Figures 2a and 2b of the drawings.

Referring now to Figure 2c of the drawings, it will be seen that a power drum stand 18 is mounted on the rear end portions of the base bars 1.

The stand 18 comprises the vertical legs 19 which are supported between the base bars 1 on the transverse cross bars 20 which extend between the base bars and rest thereon. The stand 18 further includes the power device supporting bars 21 mounted on the upper end portions of the legs 19. Braces 22 are rigidly connected to the stand 18 in the manner best illustrated in Figure 2c of the drawings and have their lower ends in abutting engagement with the transverse bar 23 which is mounted on the base bars 1 adjacent the rearmost pair of the standards 14. The elements 19 to 23 inclusive are preferably formed of angle iron. A stop bar 24 is mounted on the bar 23 for engagement with the adjacent pair of standards 14 for limiting the swinging movement of the standards in one direction in the manner illustrated to advantage in Figure 2c of the drawings.

A pair of spaced, parallel, co-extensive vehicle supporting beams 26 of substantially I-shaped cross section are mounted on the upper ends of the standards 14 through the medium of the hangers 25 which are identical in construction to the hangers 7 and are, therefore, interchangeable. The vehicle supporting beams, are designated by the reference numeral 26 and are disposed inwardly of the vertical plane of the base bars 1. It will also be noted from a consideration of the drawings that the ends of the beams 26 are spaced inwardly of the ends of the base bars 1.

Shafts 27 extend between the upper ends of each pair of the standards 14 and are journaled in the bearings 28 formed integrally on the upper ends of the standards. Collars 29 are fixed on the shafts 27 for retaining said shafts against sliding movement in the bearings 28. Inverted channel shaped struts 30 extend between the beams 26 adjacent each pair of the hangers 25, said struts 30 being secured to the lower sides of the beams 26.

A rod 31 extends between the end portions of the beams 26 which are adjacent the stand 18 and mounted for rotation on an intermediate portion of the rod 31 between the collars 32 is a grooved pulley 33. It is understood, of course, that the collars 32 are fixed on the rod 31 and prevent longitudinal movement of the pulley 33 on the rod. A cable 34, the end portion only of which is shown, is clamped around the pulley 33 and said cable is windable on a suitable power drum D which is mounted on the stand 18. Safety hooks 35 are mounted for swinging movement on the innermost pair of the legs 19 of the stand 18 for engagement over a transversely extending bar 36 which extends between the adjacent pair of standards 14 for positively securing the jack in elevated or operative position.

A pair of brackets 37 in the form of channel irons are mounted longitudinally on the upper sides of the forward portions of the beams 26 by any suitable means, such as by welding, for engagement with the front axle of an automobile, said brackets being of any suitable length.

Mounted for longitudinal adjustment on the rear portions of the beams 26 is a transversely disposed supporting member which is designated generally by the reference numeral 38 which is for engagement with the differential housing of the automobile. The member 38 comprises the spaced, parallel transverse bars 39 of angle iron having depending vertical portions provided with notches adjacent their ends for slidably receiving the beams 26. Spaced, parallel, longitudinally disposed members 40 of substantially inverted V-shaped cross section have their ends fixed to intermediate portions of the vertical sides of the bars 39, for engagement with the differential housing. The adjustability of the member 38 adapts the device for use on automobiles of various lengths, as will be apparent.

In use, the vehicle to be lifted is disposed longitudinally above the beams 26, said beams and the standards 14 being disposed in lowered or inoperative position as designated in broken lines in Figures 2a, 2b and 2c of the drawings. The power actuated drum (not shown) which is to be mounted on the stand 18 is then operated in a manner to operate the cable 34 thereon and swing the beams 26 and the standards 14 upwardly to the position indicated in full lines in the drawings.

The vehicle is so positioned that, when the beams 26 move upwardly and forward the brackets 37 will engage the front axle and the members 40 of the support 38 will engage the differential housing of the automobile. A suitable tool may be inserted between the members 40 for removing and replacing the drain plug in the differential housing.

It will be thus seen that the vehicle will be raised. The swinging movement of the standards 14 toward operative position is limited by a stop bar 24 which is engageable by the rearmost pair of the standards 14. When said rearmost pair of the standards 14 engages the stop bar 24, the hooks 35 will engage over the bar 36 to positively secure the standards 14 and the beam 26 to return to the position indicated in broken lines in the drawings.

It is believed that the many advantages of a vehicle jack constructed in accordance with this invention will be readily understood, and although the preferred embodiment of the invention is as illustrated and described, it is to be understood that changes in the details of construction may be had which will fall within the scope of the invention as claimed.

What is claimed is:

1. A vehicle jack comprising a pair of spaced parallel base bars, casters mounted on the base bars for supporting same in elevated position, pairs of hangers fixed on the base bars at longitudinally spaced points and in spaced relation to the ends of the base bars, a shaft supported, at its opposite end portions, in each pair of the hangers, a pair of standards mounted for swinging movement on the end portions of each shaft, a pair of spaced, parallel vehicle engaging beams, pairs of hangers fixed to the beams at longitudinally spaced points, a shaft extending transversely through the upper end portions of each pair of the standards, the hangers on the beams being journaled on the end portions of the second named shafts, and means engageable with one pair of the standards for releasably retaining the standards and the beams in operative position.

2. A vehicle jack comprising a pair of spaced, parallel, co-extensive base bars, pairs of spaced, parallel, transverse struts extending between the base bars and secured to the lower sides thereof, substantially U-shaped housings mounted between the end portions of each pair of struts, a caster mounted in each housing and depending therefrom for supporting the base bars in elevation position, pairs of hangers fixed at longitudinally spaced points on the base bars, a transverse shaft extending between each pair of hangers and supported by said hangers on the base bars, a pair of standards mounted for swinging movement in a vertical plane on each of the shafts, a shaft extending transversely through the upper end portions of each pair of standards, a pair of spaced, parallel co-extensive vehicle engaging beams, pairs of hangers fixed to the beams at longitudinally spaced points and rotatably mounted on the end portions of the second named shafts, struts extending transversely between the beams adjacent the last named hangers, and collars fixed on the first and second named shafts and engageable with the standards in a manner to retain said standards in position on the shafts.

3. A vehicle jack comprising a pair of spaced, parallel, co-extensive base bars, pairs of spaced, parallel, transverse struts extending between the base bars and secured to the lower sides thereof substantially U-shaped housings mounted between the end portions of each pair of struts, a caster mounted in each housing and depending therefrom for supporting the base bars in elevated position, pairs of hangers fixed at longitudinally spaced points on the base bars, a transverse shaft extending between each pair of hangers and supported by said hangers on the base bars, a pair of standards mounted for swinging movement in a vertical plane on each of the shafts, a shaft extending transversely through the upper end portions of each pair of standards, a pair of spaced, parallel, co-extensive vehicle engaging beams, pairs of hangers fixed to the beams at longitudinally spaced points and rotatably mounted on the end portions of the second named shafts, struts extending transversely between the beams adjacent the last named hangers, collars fixed on the first and second named shafts and engageable with the standards in a manner to retain said standards in position on the shafts, the ends of the beams being spaced inwardly from the corresponding ends of the base bars, a stand mounted on one end portion of the base bars and adapted to support a power drum, means connected with the beams for operatively connecting said beams with the power drum, hooks mounted on the stand for swinging movement in a vertical plane and engageable with the adjacent pair of standards for releasably retaining the standards and the beams in operative position, and a stop bar mounted transversely on the base bars and engageable with the adjacent pair of standards for limiting the swinging movement of the standards in one direction on the base bars.

In testimony whereof we affix our signatures.

WILLIAM L. BARROWMAN.
GUYE L. HULL.